United States Patent [19]

Zayhowski

[11] Patent Number: 5,048,051

[45] Date of Patent: Sep. 10, 1991

[54] OPTICALLY-STABILIZED PLANO-PLANO OPTICAL RESONATORS

[75] Inventor: John J. Zayhowski, Pepperell, Mass.

[73] Assignee: Massachusetts Institute of Technology, Cambridge, Mass.

[21] Appl. No.: 487,612

[22] Filed: Mar. 2, 1990

[51] Int. Cl.$^5$ ............................................... H01S 3/08
[52] U.S. Cl. ........................................ 372/101; 372/9; 372/34; 372/29; 359/299
[58] Field of Search ................. 372/66, 34, 98, 101, 372/99, 105, 108; 350/353

[56] References Cited

U.S. PATENT DOCUMENTS

| | | | |
|---|---|---|---|
| 4,672,618 | 6/1987 | Wijntjes et al. | 372/34 |
| 4,675,874 | 6/1987 | Pohler et al. | 372/34 |
| 4,730,323 | 3/1988 | Seaton | 372/34 |
| 4,740,988 | 4/1988 | Knollenberg et al. | 372/34 |
| 4,797,893 | 1/1989 | Dixon | 372/34 |
| 4,823,348 | 4/1989 | Hercher | 372/34 |
| 4,876,690 | 10/1989 | Nishida et al. | 372/34 |

Primary Examiner—Léon Scott, Jr.
Attorney, Agent, or Firm—Choate, Hall & Stewart

[57] ABSTRACT

An optically-controlled lens is used to stabilize a plano-plano optical resonator. The lens is made of a material whose shape, refractive index, or both can be changed by optically-induced localized heating. A control light source is provided to irradiate the lensing element and cause the required heating. In an optically-pumped laser, the pump light may function as the control light. For a longitudinally-pumped Nd:YAG laser, a suitable optically-controlled lens can be tailored out of GaAlAs to give the appropriate amount of optical absorption at the pump wavelength, while being transparent to the lasing wavelength.

26 Claims, 3 Drawing Sheets

OPTICALLY-STABILIZED PLANO-PLANO OPTICAL RESONATORS

The Government has rights in this invention pursuant to contract Number F19628-90-C-0002 awarded by the Department of the Air Force.

BACKGROUND OF THE INVENTION

This invention relates to the field of optical resonators.

In order to form a passive high-Q optical resonator, one or more of the mirrors forming the optical cavity is usually curved to compensate for optical diffraction within the cavity. This requirement complicates the fabrication of such resonators since curved mirrors usually require individual handling. In addition, once such a curved-mirror optical resonator is constructed, the cavity mode is precisely defined, and optical input to the cavity must be precisely aligned to couple efficiently to that mode.

An alternative approach is to use two-mirror, plano-plano, optical cavities. Such cavities can easily be produced by polishing two sides of a crystal (or other material) flat and parallel. The two polished sides can then be dielectrically coated to form mirrors. The resulting cavity has translational symmetry in the plane perpendicular to the cavity axis. This makes alignment of the optical input to the cavity easier than in the case of a curved-mirror optical resonator, and allows the positioning of the input to avoid defects in the mirrors or the material between the mirrors. Such a cavity, however, suffers from diffraction losses. In addition, the degree of parallelism required between the two polished surfaces can make the fabrication of a high-Q, plano-plano, optical resonator impractical.

The present invention provides a method of producing high-Q, plano-plano, optical resonators with greatly reduced diffraction losses and greatly reduced requirements on the parallelism of the mirrors.

SUMMARY OF THE INVENTION

Optically-stabilized plano-plano optical resonators, according to the present invention, consist of a plano-plano optical cavity containing a material (the stabilizing material) whose refractive index, physical shape, or both can be controlled optically, through the use of a control light, to create a lens which stabilizes the otherwise plano-plano cavity. The control light can be independent of the light for which the resonator is intended to be used (the use light), or may be the use light itself. The stabilizing material is selected to be absorptive at the wavelength of the control light. The absorption of a spatially-localized control light will lead to localized heating, causing local thermal expansion of the stabilizing material and/or a thermally-induced change in its refractive index. Either or both of these effects can produce a lens in the stabilizing material. If the lens created is a positive lens, properly oriented with respect to the optical cavity, it will stabilize the optical resonator. Such a lens can also be formed through non-absorptive, nonlinear optical interactions of a control light with crystals. This approach is less versatile than the present invention, which uses a less limiting class of materials and can operate at lower power levels.

In an optically-stabilized plano-plano optical resonator, the properties of the lens formed within the stabilizing material are determined by the material properties and dimensions of the stabilizing material, and the spatial profile, spectral profile, and intensity of the control light. All of these parameters can be controlled to obtain the most suitable results for a given application.

An optical resonator created according to this invention can be mass produced using all flat components. The resulting resonator will have translational symmetry in the plane perpendicular to the cavity axis. This will allow the positioning of the active portion of the resonator in order to avoid defects in the optical resonator.

An optically-stabilized plano-plano optical resonator can be used as the resonant cavity for a laser. In the case of an optically-pumped laser, the pump light can also serve as the control light. Since the gain element in some lasers has the properties of the stabilizing material described above, thermal lensing has been demonstrated and, in some cases, exploited in prior art lasers. However, in these cases, there is little control of the lens formed in the gain medium. Only by including a separate stabilizing element, as described in the present invention, can the laser be controllably stabilized.

DESCRIPTION OF THE PREFERRED EMBODIMENT

Figure 1A:
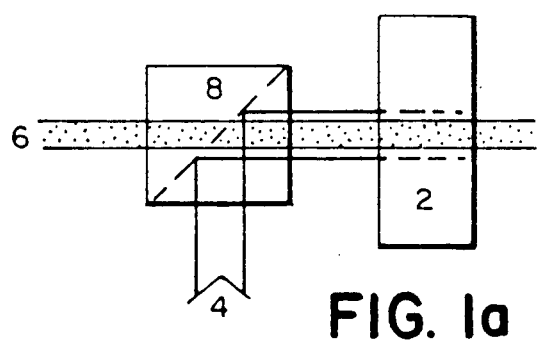
FIGS. 1a, 1b are a cross-sectional view of an optically-controlled lens.
Figure 1B:
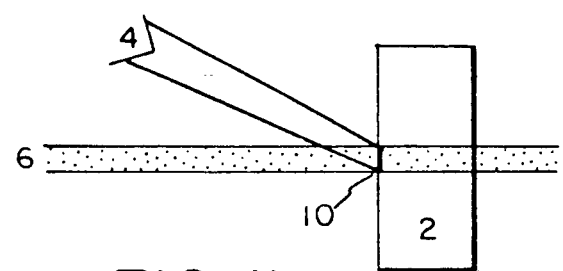

In the most basic embodiment of the present invention, illustrated in FIG. 1, an optical lensing element 2 is made of a material whose shape, refractive index, or both changes when exposed to a control light 4. In one embodiment (FIG. 1a), the control light 4 is combined collinearly with a use light 6 through the use of dichroic optics 8. In another embodiment (FIG. 1b), the control light 4 is strongly absorbed at the surface of the lensing element 2, and the control light 4 and the use light 6 need not be collinear. In this case, it is sufficient that the two are incident on the lensing element 2 at a common point 10.

The optical properties of the lensing element 2 may change as a result of an expansion of the material due to heating caused by the absorption of the control light 4 (as is common in most absorptive optical materials), an increase in the refractive index of the material due to heating caused by the absorption of the control light 4 (as in, for example, GaAlAs, Si, YAG), stress induced changes in the refractive index from the nonuniform expansion of the material due to the heating caused by the absorption of the control light 4, nonlinear optical effects, or a combination of effects. Once the optical properties of the lensing element 2 are modified by the control light 4, the lensing element 2 serves as a lens.

The strength of the lens can be controlled through the choice of the material which forms the lensing element 2, and the intensity and the spatial and spectral profiles of the control light 4.

To create a positive lens through the mechanism of thermal expansion, the expansion must be greatest at the center of the lens. The spatial profile of the control light 4, the thermal conductivity and thermal expansion coefficient of the lensing element 2, and the heat sinking of the lensing element 2 dictate the spatial expansion profile. In many applications, a control light with a gaussian profile is suitable. To create a positive lens through the mechanism of thermally-induced changes in the refractive index, the induced changes must result in a higher refractive index at the center of the lens than at the edges. In this case, the spatial refractive index profile is dictated by the spatial profile of the control light 4, the thermal conductivity and the change of refractive index with temperature of the lensing element 2, and the heat sinking of the lensing element 2. Some materials experience a positive change of refractive index with temperature, while others experience a negative change. Again, in many cases, a control light with a gaussian profile is suitable. Those skilled in the art will recognize the ease with which other control light specifications can be designed and implemented to suit the properties of a given lensing element in a particular application.

The optically-controlled lens according to the invention may be used external or internal to an optical resonator or laser cavity to collimate light or to provide stability. The remainder of the preferred embodiments expand on the use of the optically-controlled lens internally as a cavity stabilizer.

Figure 2A:
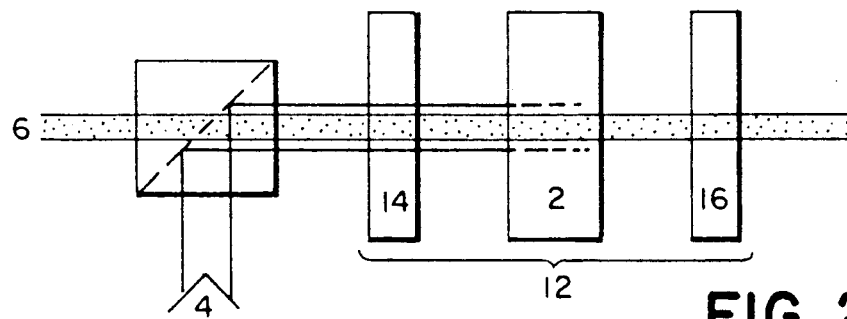
FIGS. 2a, 2b are a cross-sectional view of a discrete element, optically-stabilized, plano-plano, optical resonator.
Figure 2B:
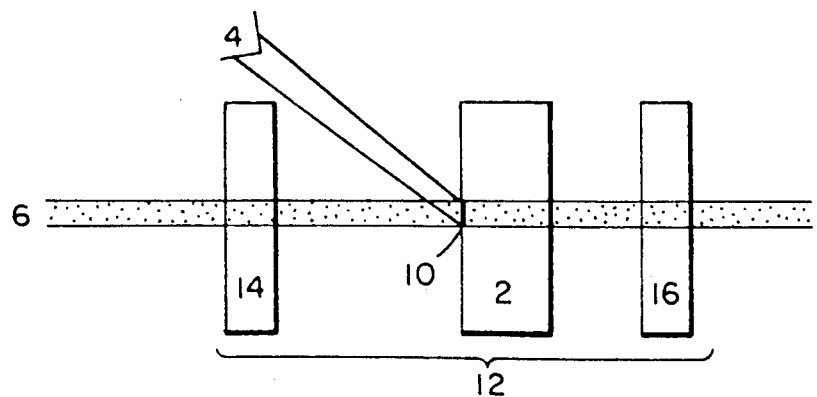

In one of the preferred embodiments, illustrated in FIG. 2, an optical lensing element 2, whose shape, refractive index, or both changes when exposed to a control light 4, is placed inside a plano-plano optical resonator 12 formed between two flat mirrors 14 and 16. The control light 4 may be combined collinearly with the light for which the resonator is intended to be used (the use light 6), as in FIG. 2a. If the control light 4 is absorbed strongly enough, the control light 4 and the use light 6 need only be incident on the lensing element 2 at a common spot 10, as in FIG. 2b. In either case, the lens formed in the lensing element 2 when it is irradiated by the control light 4 is aligned along the optic axis of the resonator 12 when the resonator is properly aligned with the use light 6. If a positive lens is formed, the lens can stabilize the optical resonator 12 by compensating for optical diffraction within the cavity and decreasing the requirements on the parallelism of the mirrors 14 and 16.

Figure 3A:
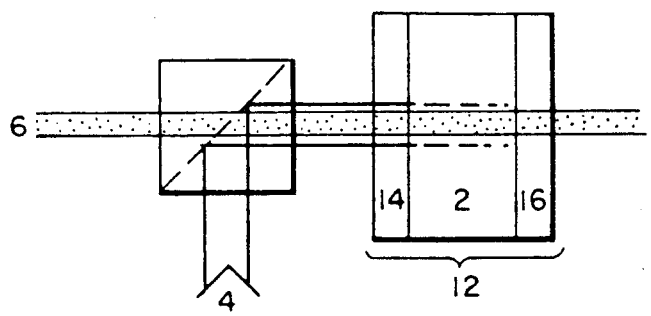
FIGS. 3a, 3b are a cross-sectional view of a monolithic, optically-stabilized, plano-plano, optical resonator.
Figure 3B:
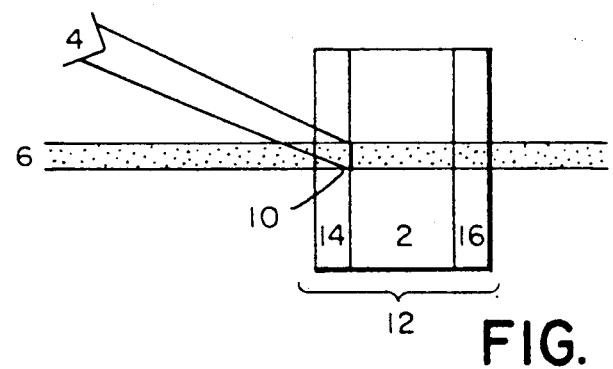

The optically-stabilized optical resonator can be created using discrete components, as depicted in FIG. 2, or created as a monolithic device by depositing the dielectric mirrors 14 and 16 directly on the lensing element 2, as depicted in FIG. 3. FIG. 3a shows a monolithic embodiment of the optically-stabilized optical resonator where the control light 4 and the use light 6 are combined collinearly. FIG. 3b shows a monolithic embodiment of the resonator where the control light 4 and the use light 6 are coincident on the lensing element 2 at a common spot 10.

Figure 4A:
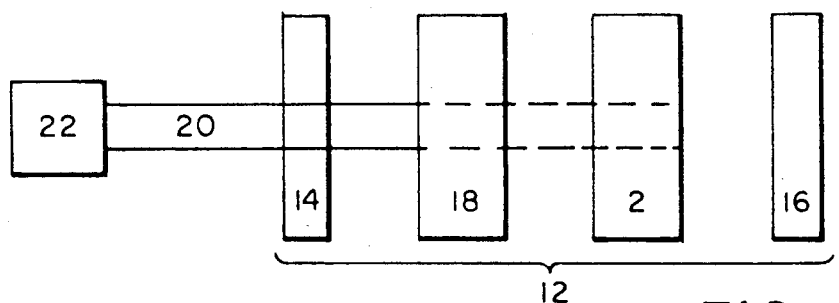
FIGS. 4a, 4b are a cross-sectional view of a discrete element, optically-stabilized, plano-plano, optical resonator used as the resonant cavity of an optically-pumped laser.
Figure 4:
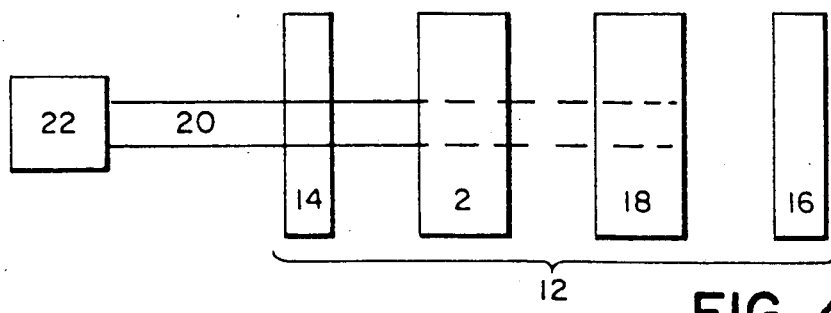

In another embodiment, the optical resonator 12 contains, in addition to the lensing element 2, a gain medium 18, transforming it into a laser cavity. In the case of an optically-pumped laser, the laser pump light 20 can serve as the control light, as illustrated in FIG. 4. In this embodiment, the lensing element 2 must be transparent to light at the lasing wavelength, but may be strongly absorbing at the pump wavelength if the gain medium 18 is positioned between the pump source 22 and the lensing element 2, as shown in FIG. 4a. The lensing element 2 may be positioned between the pump light source 22 and the gain medium 18, as shown in FIG. 4b, if the lensing element 2 does not strongly absorb the pump light 20.

As an example of the embodiment depicted in FIG. 4, a longitudinally pumped Nd:YAG microchip laser could contain a small piece of GaAlAs within the cavity. The band edge of the GaAlAs would be tailored to give the appropriate amount of optical absorption at the pump wavelength, and would be transparent to the lasing wavelength. It could be positioned in the cavity on the far side of the Nd:YAG from the pump source, and absorb the light transmitted by the Nd:YAG. Since GaAlAs has a positive change in refractive index with increasing temperature, the absorption of the pump light would result in a thermally-induced positive lens which would stabilize the laser cavity.

The optical lensing element 2 in an optically-stabilized optical resonator can serve additional useful functions. In the previous example, the electro-optic effect in GaAlAs could be used to electrically tune the frequency of the Nd:YAG laser.

Figure 5A:
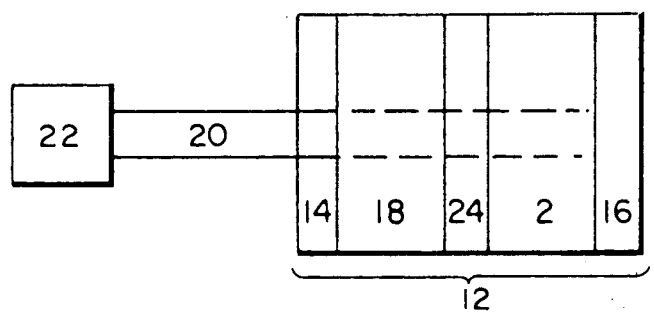
FIGS. 5a, 5b are a cross-sectional view of an all solid-state, optically-stabilized, plano-plano, optical resonator used as the resonant cavity of an optically-pumped laser.
Figure 5B:
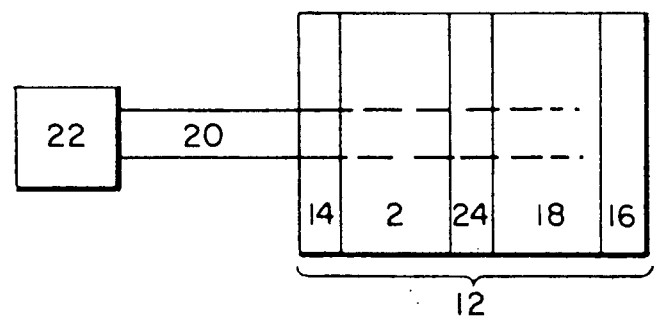

The optically-stabilized laser cavity can be created using discrete components, as depicted in FIGS. 4a and 4b, or created as an all solid-state device, as shown in FIGS. 5a and 5b. In FIG. 5, the mirrors 14 and 16 are deposited directly on the gain medium 18 and the lensing element 2. Also shown in an antireflection coating 24 between the gain medium 18 and the lensing element 2. FIG. 5a shows the case where the gain medium 18 is located between the pump source 22 and the lensing element 2. FIG. 5b shows the case where the lensing element 2 is located between the pump source 22 and the gain medium 18.

It is understood that in the case of an optically-stabilized plano-plano optical resonator used as a laser cavity, the control light may be independent of any pump light and introduced similarly to that shown in FIGS. 1, 2, and 3.

It is recognized that modifications and variations of the present invention will occur to those skilled in the art, and it is intended that all such modifications and variations be included within the scope of the claims.

What is claimed is:

1. A controllable lens for refracting light comprising:
    an optical lensing element formed of a material which transmits the light and which has temperature-dependent optical properties, and
    control light source means for illuminating the lensing element with control light, said control light having a spatial intensity distribution across a surface of the lensing element to cause nonuniform heating in the lensing element, thereby causing a nonuniform change in the optical properties of the lensing element,
    whereby the lensing element functions as a controllable lens which controllably refracts the light.

2. The device of claim 1 used in conjunction with an optical resonator wherein the lensing element is external to the resonator and is used to collimate light into or out of the resonator.

3. The device of claim 1 used in conjunction with a laser wherein the lensing element is external to the laser and is used to collimate light into or out of the laser.

4. An optical resonator comprising:
a resonant cavity formed between two mirrors,
light source means for introducing light into the cavity,
an optical lensing element disposed within the cavity, the lensing element formed of a material which transmits the light and which has temperature-dependent optical properties, and
control light source means for illuminating the lensing element with control light, said control light having a spatial intensity distribution across a surface of the lensing element to cause nonuniform heating in the lensing element, thereby causing a nonuniform change in the optical properties of the lensing element,
whereby the lensing element functions as a controllable lens which controllably refracts the light to stabilize the transverse cavity modes of the resonator.

5. The optical resonator of claim 2 wherein the mirrors are in the form of coatings directly deposited onto the lensing element.

6. A laser comprising:
a laser cavity with a gain medium disposed between two mirrors,
pump source means for pumping the gain medium to produce light,
an optical lensing element disposed within the cavity, the lensing element formed of a material which transmits the light and which has temperature-dependent optical properties, and
control light source means for illuminating the lensing element with control light, said control light having a spatial intensity distribution across a surface of the lensing element to cause nonuniform heating in the lensing element, thereby causing a nonuniform change in the optical properties of the lensing element,
whereby the lensing element functions as a controllable lens which controllably refracts the light to stabilize the transverse cavity modes of the laser cavity.

7. The device of claim 6 wherein the laser is an optically-pumped laser and the pump source means is a pump light source for producing pump light.

8. The device of claim 1, 4, 6, or 7 wherein the lensing element is flat when the control light has zero intensity.

9. The device of claim 1, 4, 6, or 7 wherein the lensing element is a semiconducting material.

10. The device of claim 1, 4, 6, or 7 wherein the lensing element is GaAlAs.

11. The device of claim 1, 4, 6, or 7 wherein the lensing element is Si.

12. The device of claim 1, 4, 6, or 7 wherein the control light and the light are collinear.

13. The device of claim 1, 4, 6, or 7 wherein the control light and the light are coincident on the lensing element at a common spot.

14. The device of claim 1, 4, 6, or 7 wherein the control light is the light.

15. The optically-pumped laser of claim 1 wherein the control light is the pump light.

16. The device of claim 4, 6, or 7 wherein the mirrors at each end of the cavity are flat.

17. The laser of claim 6 or 7 wherein the lensing element is positioned between the control light source means and the gain medium.

18. The laser of claim 6 or 7 wherein the gain medium is positioned between the control light source means and the lensing element.

19. The laser of claim 6 or 7 wherein one mirror is directly deposited onto the gain medium and the other mirror is directly deposited onto the lensing element.

20. The laser of claim 6 or 7 wherein the gain medium and the lensing element form an all solid-state cavity.

21. The laser of claim 6 or 7 wherein the gain medium is Nd:YAG.

22. The laser of claim 6 or 7 wherein one of the mirrors is directly deposited onto the gain medium.

23. The laser of claim 6 or 7 wherein one of the mirrors is directly deposited onto the lensing element.

24. The laser of claim 6 or 7 wherein the gain medium and the lensing element form an all solid-state cavity and are separated by only an antireflective coating.

25. The device of claims 1, 2, 3, or 4 wherein the spatial intensity distribution of the control light source means is controllable.

26. An optically-pumped laser comprising:
a laser cavity containing Nd:YAG as a gain medium disposed between two flat mirrors,
pump source means for longitudinally pumping the gain medium with pump light to produce light, and
a lensing element made of GaAlAs disposed within the cavity, the GaAlAs having a band edge tailored to transmit the light and to absorb pump light, the GaAlAs positioned on the far side of the Nd:YAG from the pump source, whereby the GaAlAs absorbs pump light transmitted by the Nd:YAG, said pump light having a spatial intensity distribution across a surface of the GaAlAs to cause nonuniform heating in the GaAlAs, thereby causing a nonuniform change in the optical properties of the GaAlAs,
whereby the GaAlAs functions as a thermally-induced positive lens which refracts the light to stabilize the transverse cavity modes of the laser cavity.

* * * * *